J. T. WEST.
Pharmaceutical Apparatus.
No. 222,109.    Patented Nov. 25, 1879.
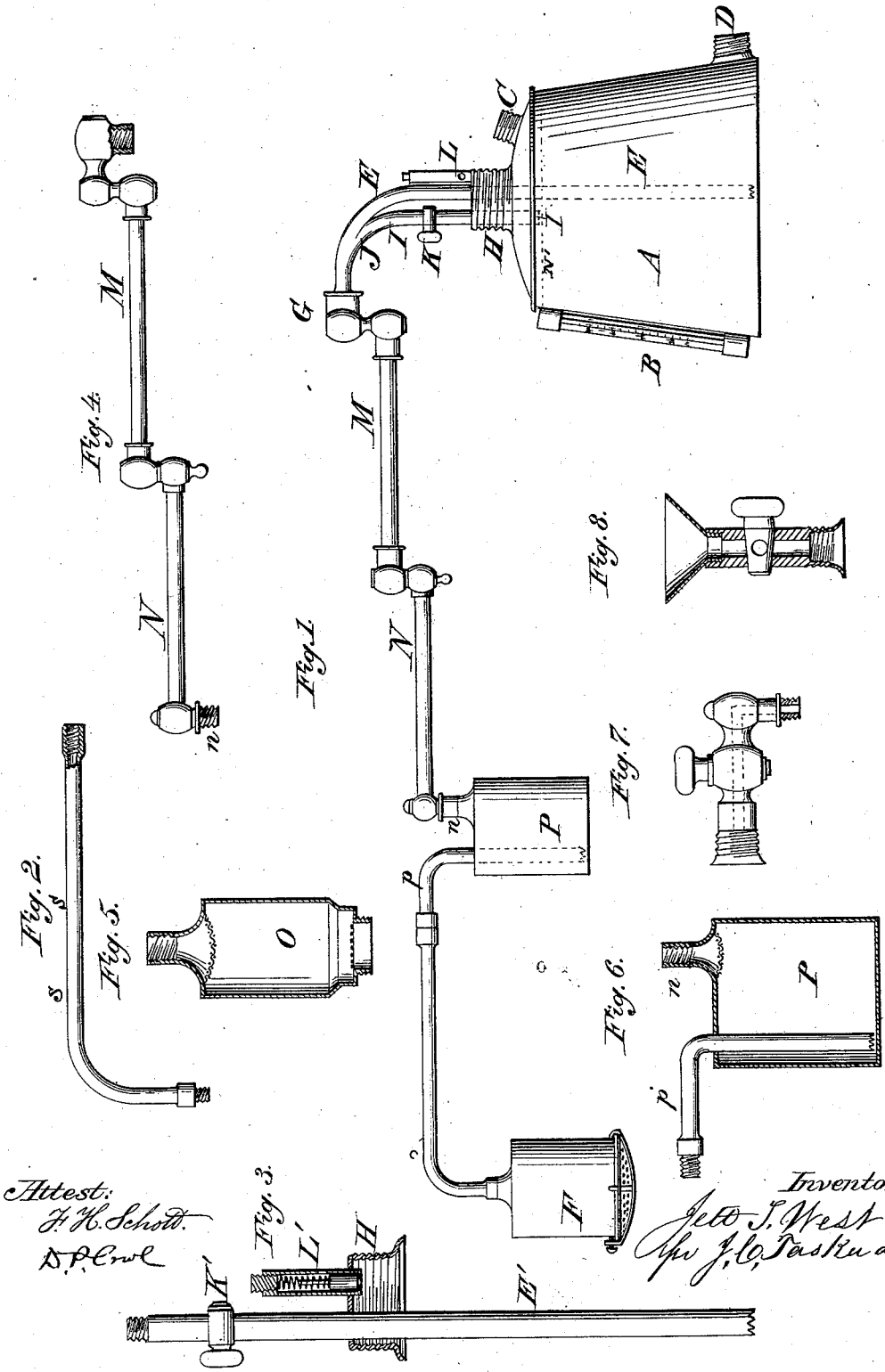

UNITED STATES PATENT OFFICE.

JETT T. WEST, OF SELMA, ALABAMA.

IMPROVEMENT IN PHARMACEUTICAL APPARATUS.

Specification forming part of Letters Patent No. 222,109, dated November 25, 1879; application filed August 15, 1879.

*To all whom it may concern:*

Be it known that I, Dr. JETT T. WEST, of Selma, in the county of Dallas and State of Alabama, have invented certain new and useful Improvements in a Steam-Pressure Apparatus for Chemical, Pharmaceutical, and Culinary Purposes; and I do hereby declare the following to be a full, clear, and exact description of the invention, such as will enable others skilled in the art to which it appertains to make and use the same, reference being had to the accompanying drawings, and to letters of reference marked thereon, which form a part of this specification, similar letters indicating corresponding parts in the different figures.

Figure 1 represents a side view of the apparatus when put together for operation. Fig. 2 shows the outer section of pipe E, Fig. 1. Fig. 3 represents a straight pipe that may be used in place of pipe E upon collar H. Fig. 4 shows a combination of pipes and joints made reversible and universal. Fig. 5 represents one form of a receptacle-chamber. Fig. 6 shows another form of a receptacle-chamber with outlet-pipe inserted. Figs. 7 and 8 represent stop-cocks with attachments.

The object of this invention is to adapt a steam-pressure apparatus to use for chemical, pharmaceutical, and culinary purposes; and my invention consists in improvements in such apparatus, as will be hereinafter more fully set forth, and pointed out in the claims.

A, Fig. 1, is a steam generator or boiler, made of any desirable material, of a sufficient thickness or strength to sustain the requisite pressure, made in any desired shape and capacity to accomplish the object designed, and arranged to be heated in any convenient manner, as on a grate-stove, gas-flame, or lamp.

B is a glass water-gage, attached in the usual way, and to indicate the height of the water in the boiler. If desired, a thermometer of either kind can be placed in the water-gage or other part of the boiler.

C is a screw-plug for filling the apparatus by a funnel, as in Fig. 8. D is a screw-plug near the bottom of boiler for the purpose of attaching a faucet, Fig. 7, to the end of which may be attached any of the chambers for percolation, filtration, &c.

E is a curved pipe leading from the bottom of the boiler, to be of any desired length, shape, &c., curved or turned with elbows, provided with a screw-thread at the end, to which may be attached any of the chambers. It is also provided with a screw-coupling at G, for the purpose of cleaning, disconnecting, or attaching other pipes to it.

Fig. 2 shows the outer section of pipe E when disconnected from the joint G. The pipe E is secured to a nut which screws onto a collar, H, in the top of the boiler, which may be screwed on or off at will. To this nut is also secured another pipe, I, which begins just above the water-line in the boiler, and it forms a junction with the pipe E at J. The pipe I is provided with a stop-cock, K, which can be operated at will. To the same nut is also attached any style of reliable valve, L, for the purpose of relieving the boiler of all surplus pressure, and thereby preventing any accident to the operator or apparatus. This safety-valve is made adjustable in order to attain any desirable pressure.

Pipe E is slotted in the lower end, that rests upon the bottom of the boiler, so as to admit a free flow of water, when so desired by the operator, through the pipe to any of the chambers. The dotted line N' represents the water-line when the boiler is filled.

Fig. 3 represents a straight pipe, E', connected to the nut in the same manner as the pipe E in Fig. 1, and it may be screwed to the collar H in place of the pipe E when desired. This straight pipe is provided with a screw-thread at the upper end, to which may be attached any other pipe or connections that may be desired. This pipe E', Fig. 3, is also provided with a stop-cock, K', to prevent the escape of steam until the desirable pressure is attained, and can be opened at will. This pipe also reaches the bottom of the boiler, and is also slotted as pipe E, Fig. 1. To this female nut in Fig. 3 a similar safety or pass valve, L', is attached, as already described in Fig. 1, and to accomplish the same object.

Fig. 4: M N show a representation of a universal or reversible combination of joints and pipes to be screwed onto pipe Fig. 3, or to the pipe E at the joint G in Fig. 1. At the termination of the pipe Fig. 4 is an elbow-joint, n, with screw-thread, to which may be attached any of the receptacle-chambers (already mentioned in Fig. 1) on the pipe E. The object of this pipe and universal joints is to adapt the apparatus to any convenient position to suit the various purposes for which it is designed.

Fig. 5: O is a receptacle-chamber, to be attached as may suit the convenience of the operator. The waves and dotted lines in the top of the connecting-tube represent a disk of wire-gauze, for the purpose of spreading the current of steam, water, or other menstruum that is forced through, and to prevent any fine particles from passing up the tube or pipe. The lower dotted line represents a disk of perforated tin, wire-gauze, or felt, that may be used either separate or combined, as the nature of the substance may require.

Fig. 6: P is a representation of a chamber to be screwed onto the pipe E, Fig. 1, or to the universal pipe, Fig. 4, in the same manner as the other chambers. Fig. 6 is also provided with a curved pipe, $p$, constructed in the same manner as the pipe E in Fig. 1, except it is made fast to the chamber. The object to be accomplished by this chamber is to bring under pressure from the boiler any corrosive or volatile liquid or preparation which it may not be desirable to heat to the degree of temperature indicated in the boiler, keeping the boiler free from corrosion and contamination.

Fig. 7 represents a stop-cock to be screwed onto the screw-plug D in Fig. 1, and to the end of which may be screwed any of the chambers or other vessels to receive hot or lukewarm or cold water, when so desired, or to make decoctions or percolations, infusions, &c., under any degree of steam-pressure.

Fig. 8 represents a stop-cock with a funnel attached, which is designed to be screwed onto the plug C, Fig. 1, through which the boiler may be filled when empty, and for the purpose of escape for steam when the apparatus is not in immediate use.

The operation of the apparatus is as follows: The receptacle P is charged with ether, alcohol, or other menstruum desired, and the chamber F with the medicinal substance in the form of powder, a disk of wire-gauze or other filtering material being attached to its bottom. Heat is then applied to the boiler filled with water, the steam generated passing up the steam-pipe, the stop-cock being open, and thence through the connecting-pipes N M to the chamber P, where it acts upon the upper surface of the menstruum, forcing the latter into the pipe $p$, and thence into the chamber F, containing the medicinal substance, and through the filtering material in its bottom into any measure or other receptacle.

For decoctions, remove the universal pipe and attach the pipe Fig. 2 at the joint G and the chamber F, Fig. 1, into which place the medicinal or aromatic substance or article to be cooked. Now, if the substance is hard or dry, or both, leave the faucet open until the steam has softened and prepared the powder or substance, and when this has been accomplished turn the stop-cock K and the boiling water is forced up the pipe E and on the chamber F, through the medicinal substance or compound or article to be cooked, and thence through any of the filters, percolating or other strainers that may be desired, and previously secured, as already shown, and the active principle is thus extracted in a perfect and uniform strength. Beef, chicken, mutton, tea, coffee, chocolate, soup, broth—in short, any kind of infusion, decoction, or like process—can thus be accomplished with great rapidity and dispatch.

What I claim, and desire to secure by Letters Patent, is as follows:

1. The boiler A, having the curved water-pipe E leading from its bottom, the same connected near its upper end with the short curved steam-pipe I, provided with the stop-cock K, substantially as described, and for the purpose set forth.

2. A boiler having a water-pipe and steam-pipe connected together near their upper ends, the said steam-pipe being provided with a stop-cock, in combination with a fluid-chamber, a macerating-chamber, and suitable pipes connecting said chambers and boiler, substantially as described, and for the purposes set forth.

In testimony that I claim the foregoing I have hereunto set my hand this 17th day of July, 1879.

JETT T. WEST.

Witnesses:
J. F. CERWOLEY,
JNO. C. REID.